(12) United States Patent
Watanabe (10) Patent No.: US 6,710,582 B2
(45) Date of Patent: Mar. 23, 2004

(54) DC-DC CONVERTER AND ELECTRONIC DEVICE USING THE SAME

(75) Inventor: Soichi Watanabe, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 10/310,040

(22) Filed: Dec. 5, 2002

(65) Prior Publication Data

US 2003/0111982 A1 Jun. 19, 2003

(30) Foreign Application Priority Data

Dec. 17, 2001 (JP) .......................... 2001-383359

(51) Int. Cl.[7] .............................................. H02M 3/137
(52) U.S. Cl. ...................................... 323/222; 323/282
(58) Field of Search ................................. 323/222, 224, 323/282, 283, 351

(56) References Cited

U.S. PATENT DOCUMENTS

| | | | | |
|---|---|---|---|---|
| 4,727,308 A | * | 2/1988 | Huljak et al. | ................ 323/222 |
| 4,801,859 A | * | 1/1989 | Dishner | ....................... 323/224 |
| 4,974,141 A | * | 11/1990 | Severinsky et al. | ............ 363/81 |
| 5,083,065 A | * | 1/1992 | Sakata et al. | ................ 315/307 |
| 5,736,842 A | | 4/1998 | Jovanovic | |
| 6,320,359 B1 | * | 11/2001 | Nagaya et al. | ............... 323/224 |
| 6,541,947 B1 | * | 4/2003 | Dittmer et al. | .............. 323/284 |

FOREIGN PATENT DOCUMENTS

JP  10-146048  5/1998

\* cited by examiner

*Primary Examiner*—Adolf Berhane
(74) *Attorney, Agent, or Firm*—Keating & Bennett, LLP (57) ABSTRACT

A DC-DC converter includes first and second MOSFETs. The source of the first MOSFET is connected to the node between a rectifier diode and a choke coil through a resonance coil. A series circuit including the resonance coil and the rectifier diode is connected in parallel to a series circuit including a capacitor and the second MOSFET. A diode and another capacitor are connected in parallel across the drain and source of the second MOSFET. Another diode is connected in parallel to a series circuit including the first MOSFET and the resonance coil. A control circuit is provided between an output terminal and the gates of the first and second MOSFETs so as to perform PWM control so that the first and second MOSFETs are alternately turned ON, with a period when both MOSFETs are OFF being provided between the ON periods.

16 Claims, 7 Drawing Sheets

DC-DC CONVERTER AND ELECTRONIC DEVICE USING THE SAME

BACKGROUND OF THE INVENTION

1. Field of the Invention

The present invention relates to a DC-DC converter and an electronic device including such a DC-DC converter. More particularly, the present invention relates to a DC-DC converter in which switching loss is reduced and to an electronic device including such a DC-DC converter.

2. Description of the Related Art

Figure 6:
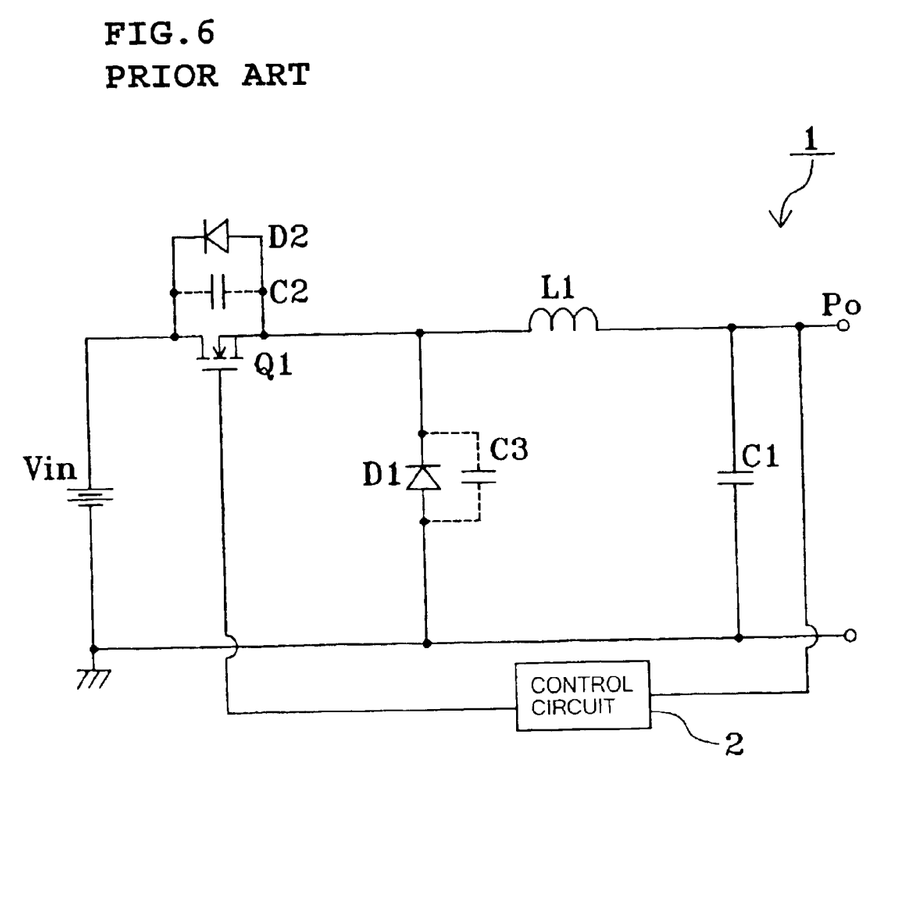
FIG. 6 is a circuit diagram of a DC-DC converter of the related art.

FIG. 6 is a circuit diagram of a step-down DC-DC converter. In FIG. 6, the DC-DC converter 1 includes a DC power supply Vin, a rectifier diode D1, a choke coil L1, a MOSFET Q1 functioning as a switching element, a smoothing capacitor C1, a diode D2, a capacitor C2, a capacitor C3, and a control circuit 2. The diode D2 is a body diode of the MOSFET Q1, and the capacitor C2 is a drain-source junction capacitance, that is, a parallel capacitance, of the MOSFET Q1. The capacitor C3 is an anode-cathode junction capacitance, that is, a parallel capacitance, of the rectifier diode D1.

The cathode of the rectifier diode D1 is connected to one end of the choke coil L1 and the anode thereof is grounded. The source of the MOSFET Q1 is connected to the node between the rectifier diode D1 and the choke coil L1 and the drain thereof is connected to one end of the DC power supply Vin. The other end of the DC power supply Vin is grounded. The other end of the choke coil L1 is connected to an output terminal Po. The smoothing capacitor C1 is connected between the output terminal Po and the ground. The control circuit 2 is connected between the output terminal Po and the gate, which is the control terminal, of the MOSFET Q1.

Now, the operation of the DC-DC converter 1 will be described. The control circuit 2 ON/OFF-drives the MOSFET Q1. First, when the MOSFET Q1 is ON, a current flows to the choke coil L1 through the MOSFET Q1 by an input voltage supplied from the DC power supply Vin. When the MOSFET Q1 is turned OFF, a current flows to the choke coil L1 through the rectifier diode D1 due to the excitation inertia of the choke coil L1. By repeating this operation, a voltage according to the duty of the ON/OFF operation of the MOSFET Q1 is output from the output terminal Po. The control circuit 2 changes the duty of switching of the MOSFET Q1 according to an output voltage in order to perform PWM control so that the output voltage is kept constant regardless of variations in the input voltage and a load.

Figure 7:
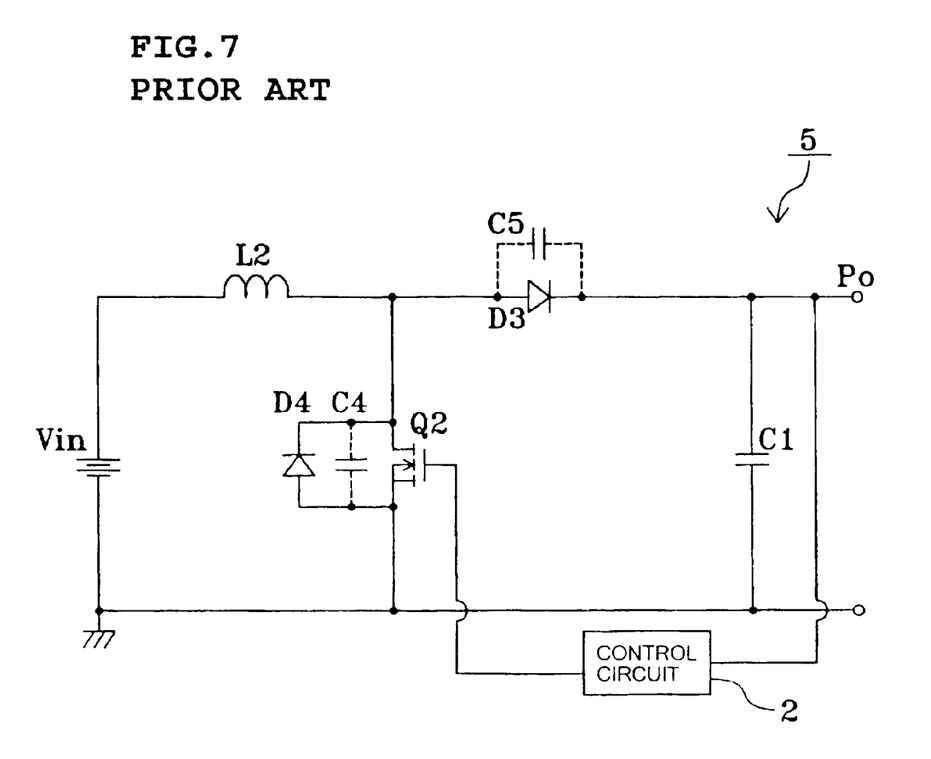
FIG. 7 is a circuit diagram of another DC-DC converter of the related art.

FIG. 7 is a circuit diagram of a step-up DC-DC converter. In FIG. 7, elements which are the same as those in FIG. 6 are denoted by the same reference numerals. In FIG. 7, the DC-DC converter 5 includes a DC power supply Vin, a rectifier diode D3, a choke coil L2, a MOSFET Q2 functioning as a switching element, a smoothing capacitor C1 a diode D4, a capacitor C4, a capacitor C5, and a control circuit 2. The diode D4 is a body diode of the MOSFET Q2, and the capacitor C4 is a drain-source junction capacitance, that is, a parallel capacitance, of the MOSFET Q2. The capacitor C5 is an anode-cathode junction capacitance, that is, a parallel capacitance, of the rectifier diode D3.

The anode of the rectifier diode D3 is connected to one end of the choke coil L2 and the cathode thereof is connected to the output terminal Po. The drain of the MOSFET Q2 is connected to the node between the rectifier diode D3 and the choke coil L2 and the source thereof is grounded. The other end of the choke coil L2 is connected to one end of the DC power supply Vin. The other end of the DC power supply Vin is grounded. The smoothing capacitor C1 is connected between the output terminal Po and the ground. The control circuit 2 is connected between the output terminal Po and the gate, which is the control terminal, of the MOSFET Q2.

Now, the operation of the DC-DC converter 5 will be described. The control circuit 2 ON/OFF-drives the MOSFET Q2. First, when the MOSFET Q2 is ON, a current flows to the choke coil L2 and then to the MOSFET Q2 by the input voltage from the DC power supply Vin so that the choke coil L2 is excited. When the MOSFET Q2 is OFF, a current flows from the DC power supply Vin through the choke coil L2 and the rectifier diode D3. At this time, the voltage at one end of the choke coil L2 is higher than that at the other end thereof because of its inertia. Therefore, when the voltage at the other end of the choke coil L2 reaches the input voltage Vin, the voltage at the one end surpasses the input voltage Vin, and thus a step-up operation is realized. Then, a voltage that is increased by repeating this operation is output from the output terminal Po. As in the DC-DC converter 1, the control circuit 2 changes the duty of switching of the MOSFET Q2 according to an output voltage in order to perform PWM control so that the output voltage is kept constant regardless of variations in the input voltage and a load.

When the switching element of the DC-DC converter is ON, a current is applied to the switching element but an ON-resistance is almost zero and thus, almost no loss is caused. On the other hand, when the switching element is OFF, a voltage is applied to the switching element but a current is not applied thereto, and thus, almost no loss is caused.

However, in the DC-DC converters 1 and 5, when the MOSFET Q1 or Q2 functioning as a switching element is turned ON/OFF, a voltage and a current are applied to the switching element for a moment, and large switching loss is caused at that time. Further, the current flowing through the MOSFET Q1 or Q2 and the rectifier diode D1 or D3 abruptly changes and thus, a high noise may be generated. Also, when the MOSFET Q1 or Q2 is turned ON, a surge recovery current flows from the cathode to the anode during a reversed recovery time of the rectifier diode D1 or D3, which leads to great loss.

In order to overcome this problem, Japanese Patent No. 3055121 discloses a configuration for realizing zero-voltage switching and zero-current switching of a switching element by using resonance.

In this configuration, switching loss and noise can be reduced. However, a capacitance that is large enough to supply a load current is required as a resonance capacitor. Accordingly, a resonance period depending on a resonance capacitor and a resonance reactor is necessary at the time when the switching element (switching element 2) is turned ON/OFF. Thus, PWM control, in which ON-period and OFF-period of the switching element is further shortened, is not performed. As a result, a wide-range variation in the input voltage and output voltage are not adequately dealt with. Further, a sine-wave resonance current is added to the output current flowing through the switching element. Therefore, a switching element having a large current capacitance is required, which leads to an increase in the size and cost of the DC-DC converter.

SUMMARY OF THE INVENTION

In order to overcome the problems described above, preferred embodiments of the present invention provide a DC-DC converter in which switching loss and noise are greatly reduced, a wide-range variation in an input voltage and output voltage is dealt with, and an increase in the size and cost is prevented, and also provide an electronic device including such a novel DC-DC converter.

According to a preferred embodiment of the present invention, a DC-DC converter includes a rectifier diode, a choke coil, one end thereof being connected to one end of the rectifier diode, a first switching element, one end thereof being connected to the node between the rectifier diode and the choke coil through a resonance coil, a first diode connected in parallel to the first switching element, a second switching element, a series circuit including a capacitor and the second switching element and connected in parallel to a series circuit including the resonance coil and the rectifier diode, and a second diode connected in parallel to the second switching element. Each of the first and second switching elements and the rectifier diode includes a parallel capacitance between terminals thereof.

The first and second switching elements are alternately turned ON, and a period when both switching elements are OFF is provided between the ON periods.

In a period when the rectifier diode conducts, the sum of a current flowing through the rectifier diode and a current flowing through the resonance coil flows through the choke coil.

The other end of the first switching element is connected to one end of a DC power supply, the other end of the choke coil is connected to an output terminal, and the other end of the rectifier diode is connected to the other end of the DC power supply, whereby a step-down operation is performed. Alternatively, the other end of the choke coil is connected to one end of a DC power supply, the other end of the rectifier diode is connected to an output terminal, and the other end of the first switching element is connected to the other end of the DC power supply, whereby a step-up operation is performed.

The DC-DC converter may further include a third diode connected in parallel to a series circuit including the first switching element and the resonance coil.

An electronic device of another preferred embodiment of the present invention includes the above-described DC-DC converter.

With this configuration, in the DC-DC converter of various preferred embodiments of the present invention, loss and noise are greatly reduced.

Also, in the electronic device of another preferred embodiment of the present invention, power consumption and noise are greatly reduced.

Other features, elements, characteristics and advantages of the present invention will become more apparent from the following detailed description of preferred embodiments thereof with reference to the attached drawings.

DETAILED DESCRIPTION OF PREFERRED EMBODIMENTS

Figure 1:
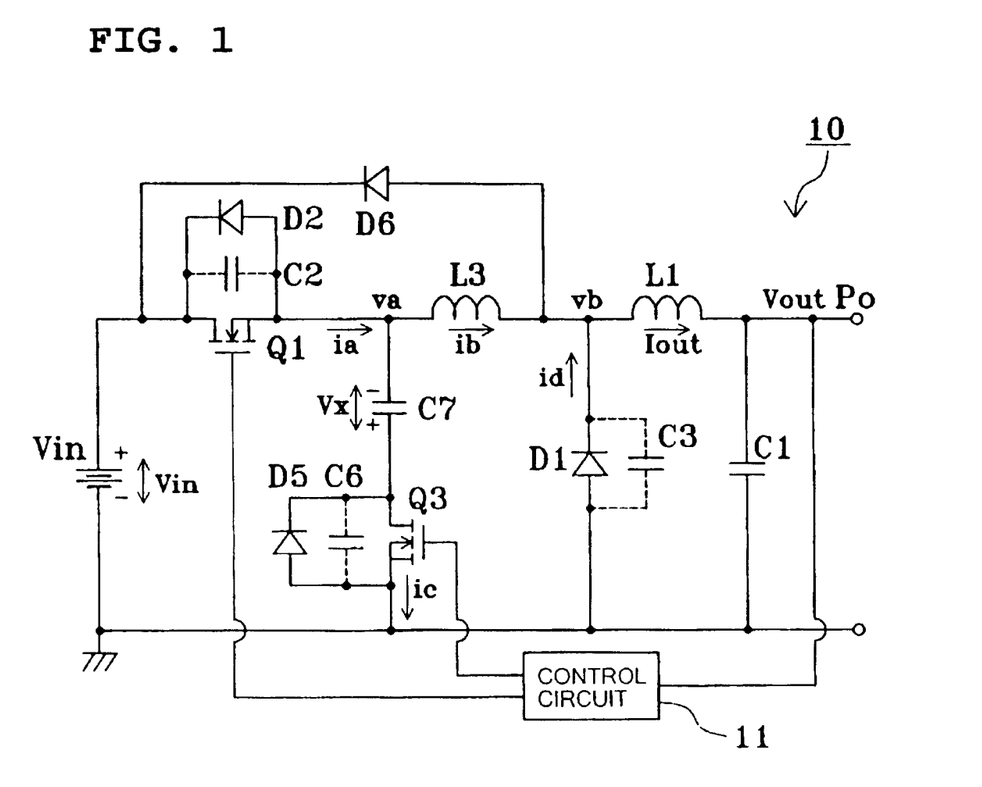
FIG. 1 is a circuit diagram showing a DC-DC converter according to a preferred embodiment of the present invention.

FIG. 1 is a circuit diagram of a DC-DC converter according to a preferred embodiment of the present invention. In FIG. 1, elements which are the same or equivalent to those in FIG. 6 are denoted by the same reference numerals and the corresponding description will be omitted.

In FIG. 1, a DC-DC converter 10 is a step-down DC-DC converter. One end, that is, the source of a MOSFET Q1 functioning as a first switching element is connected to the node between a rectifier diode D1 and a choke coil L1 through a resonance coil L3. Also, a series circuit including the resonance coil L3 and the rectifier diode D1 is connected in parallel to a series circuit including a capacitor C7 and a MOSFET Q3 functioning as a second switching element. A diode D5 and a capacitor C6 are connected in parallel across the drain and source of the MOSFET Q3. The diode D5 is a body diode of the MOSFET Q3 and the capacitor C6 is a junction capacitance, that is, a parallel capacitance, of the MOSFET Q3. Also, a diode D6 is connected in parallel to a series circuit including the MOSFET Q1 and the resonance coil L3. Further, a control circuit 11 is provided between an output terminal Po and the gates, that is, control terminals, of the MOSFETs Q1 and Q3. The connecting order of the capacitor C7 and the MOSFET Q3 may be inversed as long as they are connected in series.

Figure 2:
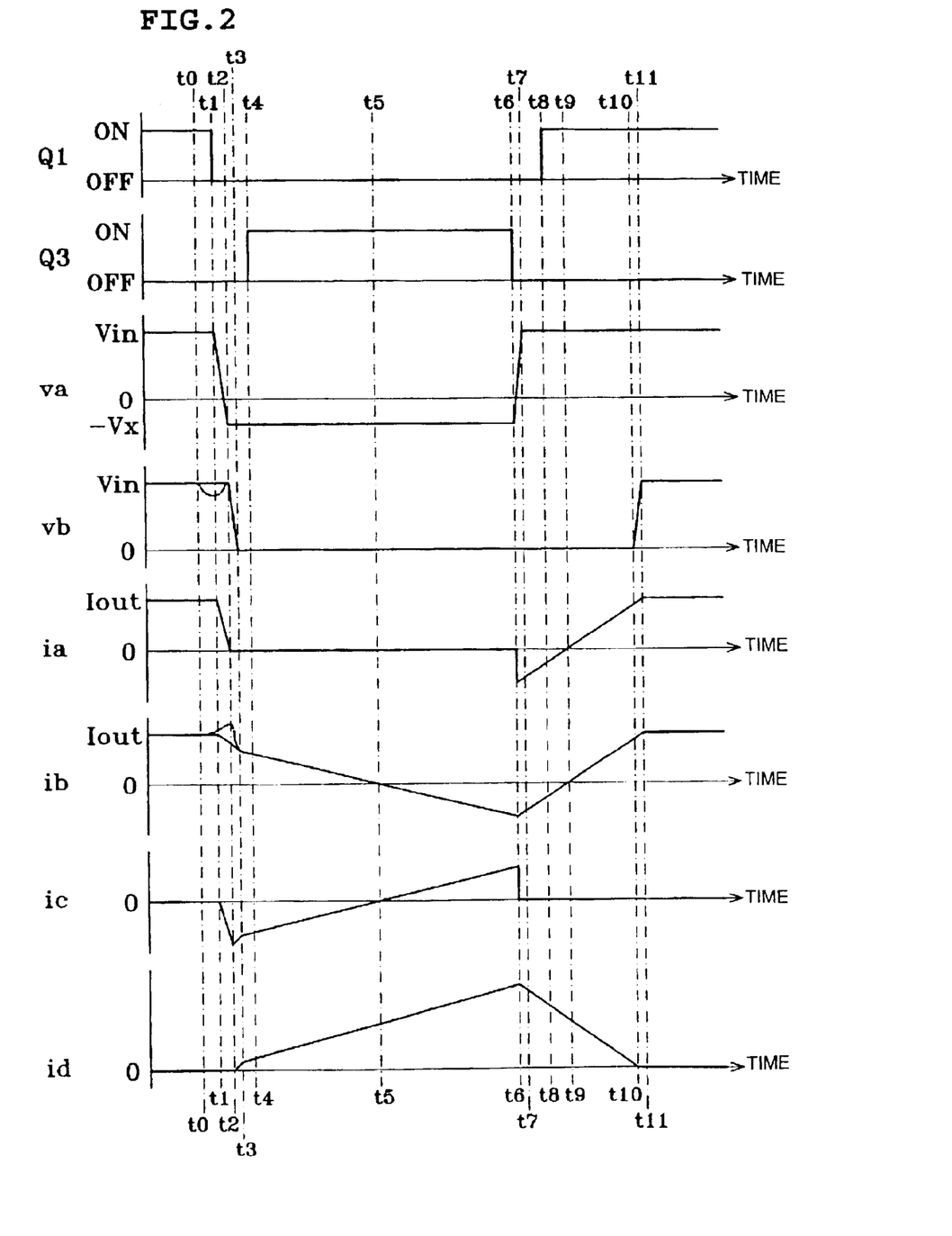
FIG. 2 is a waveform diagram showing the waveform of a signal of each portion of the DC-DC converter shown in FIG. 1.

The operation of the DC-DC converter 10 configured in this manner will be described with reference to FIG. 2. FIG. 2 is a waveform diagram showing the temporal change in voltage and current at each portion of the DC-DC converter 10. Herein, Vin represents a constant input voltage input from the DC power supply Vin, represented by the same symbol, to the DC-DC converter 10. Also, va represents the voltage at the source of the MOSFET Q1, vb represents the voltage at the cathode of the rectifier diode D1, ia represents a current flowing from the drain toward the source of the MOSFET Q1, ib represents a current flowing through the resonance coil L3 toward the choke coil L1, ic represents a current flowing from the drain toward the source of the MOSFET Q3, and id represents a current flowing from the anode toward the cathode of the rectifier diode D1. The currents ia and ic include currents which flow through the capacitors C2 and C6, which are the junction capacitances of the MOSFETs Q1 and Q3 respectively, and the diodes D2 and D5, which are body diodes. Also, the current id includes a current which flows through the capacitor C3, which is the junction capacitance of the rectifier diode D1.

In the DC-DC converter 10, a choke coil having a high inductance of about 300 $\mu$H is used as the choke coil L1. Therefore, the choke coil L1 operates as a constant current source which generates a substantially constant current Iout. Also, the capacitor C7 has a capacitance of about 0.2 $\mu$F, which is sufficiently higher than that of the capacitor C6, which is the junction capacitance of the MOSFET Q3. Thus, the capacitor C7 operates as a constant voltage source which generates a substantially constant voltage Vx. In the following description, these two points are assumed to be true. Also, it is assumed that the forward voltage of each diode is almost zero.

The control circuit 11 performs PWM control so that the MOSFETs Q1 and Q3 are alternately turned ON, with a period when both MOSFETs Q1 and Q3 are OFF being provided between the ON periods.

When the MOSFET Q1 is ON and the MOSFET Q3 is OFF, the currents ia and ib flow from the DC power supply Vin through the MOSFET Q1, the resonance coil L3, and the choke coil L1 to the output terminal Po, by the input voltage Vin generated by the DC power supply Vin. The value of each of the currents is Iout. The voltage va at the source of the MOSFET Q1 and the voltage vb at the cathode of the rectifier diode D1 are substantially equal to the input voltage Vin. The capacitor C7 is charged with a voltage Vx (>0) so that the MOSFET Q3 side is positive, and operates as a constant voltage source of the output voltage Vx. Also, the capacitor C2, which is the junction capacitance of the MOSFET Q1, is discharged. On the other hand, the capacitor C6, which is the junction capacitance of the MOSFET Q3, is charged so that the capacitor C7 side is positive. Also, the capacitor C3, which is the junction capacitance of the rectifier diode D1, is charged. Since a current is not applied to the MOSFET Q3 and the rectifier diode D1, the value of each of ic and id is zero.

At time t1, the MOSFET Q1 is turned OFF by the control circuit 11. However, since the resonance coil L3 supplies a current due to its electrical inertia, the capacitor C2 is charged and the capacitor C6 is discharged accordingly. The capacitance of each of the capacitors C2 and C6 is very small because the capacitors C2 and C6 are junction capacitances. Thus, the charge and discharge are completed in a short time, by time t2. Therefore, the current ia rapidly decreases from Iout to zero from time t1 to time t2. Also, the current ic rapidly increases, although the current polarity is negative. After the capacitor C6 has been discharged, the diode D5 is made conductive, and the current ic starts to flow through the diode 5 toward the resonance coil L3. Accordingly, the voltage va rapidly decreases from Vin to −Vx. After that, the relationship between the currents ib and ic is ib=−ic.

When the diode 5 is made conductive at time t2, the voltage at the drain of the MOSFET Q3 becomes almost zero. Thus, as described above, the voltage va at the source of the MOSFET Q1 becomes −Vx, which is lower than that of the ground by the voltage difference Vx of the capacitor C7. When the voltage va at the source of the MOSFET Q1 is decreased to −Vx, the current ib which flows through the resonance coil L3 toward the choke coil L1 starts to decrease. Since the current Iout flowing through the choke coil L1 does not change, the capacitor C3 is discharged to compensate for the reduction in the current ib, the voltage vb at the cathode of the rectifier diode D1 decreases, and thus the rectifier diode D1 is made conductive at time t3. Due to the fact that the rectifier diode D1 conducts, the voltage vb at the cathode stops decreasing and becomes substantially equal to the voltage as that of the ground. This state continues while the rectifier diode D1 conducts. At this time, a voltage difference that is substantially identical to the voltage difference Vx of the capacitor C7 is applied across the resonance coil L3 so that the side of the node between the resonance coil L3 and the choke coil L1 is positive.

Thus, the current ib which flows through the resonance coil L3 toward the choke coil L1 linearly decreases. On the other hand, the current id which flows from the rectifier diode D1 toward the choke coil L1 linearly increases accordingly. That is, from time t3, the sum of the current flowing through the resonance coil L3 and the current flowing through the rectifier diode D1 is the current flowing through the choke coil L1. Further, the variation in the current ib and the current id depends on the voltage difference Vx of the capacitor C7 and the inductance of the resonance coil L3.

After time t3, the MOSFET Q3 is turned ON at time t4. As can be seen in FIG. 2, a dead time in which both MOSFETs Q1 and Q3 are OFF is included in the period from when the MOSFET Q1 is turned OFF until the MOSFET Q3 is turned ON. When the MOSFET Q3 is turned ON, the voltage difference across the drain and source of the MOSFET Q3 is zero due to the conduction of the diode 5, and thus zero-voltage switching of the MOSFET Q3 is performed. From this time, the current −ic which has been flowing through the diode D5 flows toward the resonance coil L3 through the source-drain of the MOSFET Q3, instead of through the diode D5. Other than this, the operation of the circuit is not affected. The MOSFET Q3 should be turned ON while the diode D5 conducts. Thus, the turn-ON timing may be in the period from time t2 to time t3.

After the MOSFET Q3 is turned ON at time t4, the voltage va and the voltage vb do not change. Thus, the current ib flowing through the resonance coil L3 toward the choke coil L1 linearly decreases and the current id flowing from the rectifier diode D1 toward the choke coil L1 linearly increases accordingly. Then, when the current ib flowing through the resonance coil L3 toward the choke coil L1 reaches zero at time t5, the direction of the current ib flowing through the resonance coil L3 is reversed and the current ib flows toward the MOSFET Q3. At this time, the direction of the current ic is also reversed to positive. This reversal is performed without a problem because the MOSFET Q3 is ON. The current id flowing through the rectifier diode D1 corresponds to the current Iout flowing through the choke coil L1 at time t5, when the current ib flowing through the resonance coil L3 reaches zero, and from time t5, the current id is the sum of the current Iout flowing through the choke coil L1 and the current −ib flowing through the resonance coil L3 in the reverse direction. That is, at this time too, the sum of the current flowing through the resonance coil L3 and the current flowing through the rectifier diode D1 is the current flowing through the choke coil L1. The current −ib flowing through the resonance coil L3 in the reverse direction flows through the drain and source of the MOSFET Q3 in an ON-state, and thus, the relationship between the currents ic and ib is ic=−ib.

Then, when the MOSFET Q3 is turned OFF at time t6, the capacitor C2, which has been charged, is discharged and the capacitor C6 is charged by a resonance current of the resonance coil L3 and the capacitors C2 and C6, that is, the current −ib flowing through the resonance coil L3 in the reverse direction. Therefore, the voltage at the drain of the MOSFET Q3 increases and the voltage va rapidly increases accordingly. Since the capacitance of each of the capacitors C2 and C6 is very small because the capacitors C2 and C6 are junction capacitances, the charge and discharge are completed in a short time by time t7. Also, when the voltage va increases from time t6, the current −ib flowing through the resonance coil L3 in the reverse direction starts to decrease linearly. Accordingly, the current id flowing through the rectifier diode D1 also starts to decrease linearly. That is, at this time, too, the sum of the current flowing through the resonance coil L3 and the current flowing through the rectifier diode D1 is the current flowing through the choke coil L1.

When the discharge of the capacitor C2 is completed at time t7, the diode D2 conducts, and the current ib flowing through the resonance coil L3 is changed to the current ia, which returns to the DC power supply Vin through the diode D2 At this time, the voltage va is substantially equal to the input voltage Vin. The voltage vb is kept substantially equal to the ground voltage. At this time, since the current −ia corresponds to the current −ib, the current −ia also decreases linearly. Furthermore, variation in the currents ib and id depends on the input voltage Vin and the inductance of the resonance coil L3.

After time t7, the MOSFET Q1 is turned ON at time t8. As can be seen in FIG. 2, a dead time in which both MOSFETs Q1 and Q3 are OFF exists in the period from when the MOSFET Q3 is turned OFF until the MOSFET Q1 is turned ON. At this time, the voltage difference across the drain and source of the MOSFET Q1 is zero due to the conduction of the diode D2, and thus, zero-voltage switching of the MOSFET Q1 is performed.

From time t7, the voltage va at the source of the MOSFET Q1 is substantially equal to the voltage Vin at the DC power supply Vin. Thus, a forward voltage that is substantially identical to the input voltage Vin is applied to one end of the resonance coil L3 and a reverse current −ib decreases linearly. When the reverse current −ib of the resonance coil L3 reaches zero at time t9, the current id flowing through the rectifier diode D1 corresponds to the current Iout flowing through the choke coil L1 Furthermore, after time t9, when the forward current ib flows through the resonance coil L3 so that the current ib increases linearly, the current id flowing through the rectifier diode D1 decreases accordingly. When the current id reaches zero at time t10, the rectifier diode D1 is turned OFF. In the period from time t6 to time t10, the sum of the current flowing through the resonance coil L3 and the current flowing through the rectifier diode D1 is the current flowing through the choke coil L1. That is, in the entire period from time t3 at which the rectifier diode D1 conducts to time t10 at which the diode D1 is turned OFF, the sum of the current flowing through the resonance coil L3 and the current flowing through the rectifier diode D1 is the current flowing through the choke coil L1, which is substantially constant.

When the rectifier diode D1 is turned OFF at time t10, voltage resonance occurs in the resonance coil L3 and the capacitor C3, which is the junction capacitance of the rectifier diode D1, and the voltage vb which is double the input voltage, in which the resonance voltage is added to the input voltage, may be generated at the cathode of the rectifier diode D1. At this time, since the capacitance of the capacitor C3 is very small, the resonance frequency of the generated voltage is high, which may result in unnecessary noise. However, the diode D6 connected in parallel to the series circuit including the MOSFET Q3 and the resonance coil L3 is provided so as to supply a current from the cathode of the rectifier diode D1 toward the DC power supply Vin. Thus, the voltage resonance ends when the voltage vb increases to reach the input voltage Vin at time t11. Incidentally, when the rectifier diode D1 has sufficient voltage-resistance and the effects of noise need not be considered, the diode D6 need not be provided.

When the voltage resonance ends at time t11, the voltage across the resonance coil L3 becomes the input voltage Vin. Further, a constant current ib is applied to the resonance coil L3, the constant current ib being generated by combining the current Iout flowing through the choke coil L1 and a current for regenerating the energy stored in the resonance coil L3 during the period of voltage resonance through the diode D6.

Then, the process returns to time t1 and the above-described cycle is repeated.

In the description above, the choke coil L1 is regarded as a constant current source through which a constant current flows. Actually, a triangular ripple current is included, the current flowing through the choke coil L1 increases from time t11 to time t1, the current flowing through the diode D6 decreases accordingly, the current flowing through the diodes D6 reaches zero at time t0, and the diode D6 is turned OFF at time t0. Since the current flowing through the choke coil L1 continues to increase until time t1, the current flowing through the resonance coil L3 also increases. Then, the resonance coil L3 and the capacitor C3, which is the junction capacitance of the rectifier diode D1, perform voltage resonance, a resonance voltage, which is lower than the input voltage, is generated at the cathode of the rectifier diode D1, and a resonance current may be generated in the current ib flowing through the resonance coil L3 (indicated with a broken line in FIG. 2). However, when the inductance of the choke coil L1 is high and the triangular ripple current is low or when the capacitance of the capacitor C3, which is the junction capacitance of the rectifier diode D1, is large, time t0 corresponds to time t1 and thus, such a resonance voltage is not generated.

As described above, in the DC-DC converter 10 of preferred embodiments of the present invention, the MOSFET Q1 functioning as the first switching element and the MOSFET Q3 functioning as the second switching element are turned ON when there is no voltage difference across the drain and source due to the conduction of the body diode. Therefore, zero-voltage switching of the switching element is performed and almost no switching loss occurs.

Further, the MOSFET Q1 functioning as the first switching element and the MOSFET Q3 functioning as the second switching element are alternately turned ON, and a dead time is adequately provided so that both MOSFETs being in the ON-state at the same time can be prevented. When the MOSFETs Q1 and Q3 are turned ON or turned OFF, the junction capacitance between the terminals of each switching element, that is, the capacitors C2 and C6 functioning as the junction capacitances of the drain and source, are charged or discharged by the current ib flowing through the resonance coil L3 until the diodes D2 and D5 defining body diodes are made conductive. Accordingly, momentary discharging of the charge of the junction capacitance due to short circuit is prevented, and thus, generation of noise is prevented.

Also, during the period from time t3 to time t10, the current id flowing through the rectifier diode D1 gradually changes in accordance with the change in the current ib flowing through the resonance coil L3. Thus, generation of noise is prevented.

Also, during the period from time t10 to time t11, the cathode voltage of the rectifier diode D1 increases due to voltage resonance of the resonance coil L3 and the junction capacitance of the rectifier diode D1, and thus, the input voltage is not abruptly applied to the cathode when the rectifier diode D1 is turned OFF. Accordingly, a recovery current does not flow in the rectifier diode D1 during a reversed recovery time when the input voltage is abruptly applied to the cathode, and thus, noise and loss are greatly reduced and minimized.

The capacitance of each of the capacitors C2, C6, and C3, which are junction capacitances of the MOSFETs Q1 and Q3 and the rectifier diode D1 respectively, is small. Therefore, the resonance frequency of the resonance circuit including the resonance coil L3 is high. In other words, the resonance period is short. As mentioned in the problems of the related art, when the resonance frequency of a resonance circuit is low and the period is long, some time is required to arrange the conditions for realizing zero-voltage switching, and PWM control, in which the switching duty is greatly increased or decreased, may not be performed. However, these problems do not occur if the resonance period is short. Therefore, PWM control that deal with a wide-range variation in the input voltage and variation in the output voltage due to a load variation is performed.

Further, unlike the switching element according to Japanese Patent No. 3055121, in this preferred embodiment of the present invention, a sine-wave resonance current does not flow through the MOSFET Q1 functioning as the first switching element. Accordingly, a switching element having a current capacitance that is larger than necessary is not required and thus, increases in the size and cost of the DC-DC converter are prevented.

Figure 3:
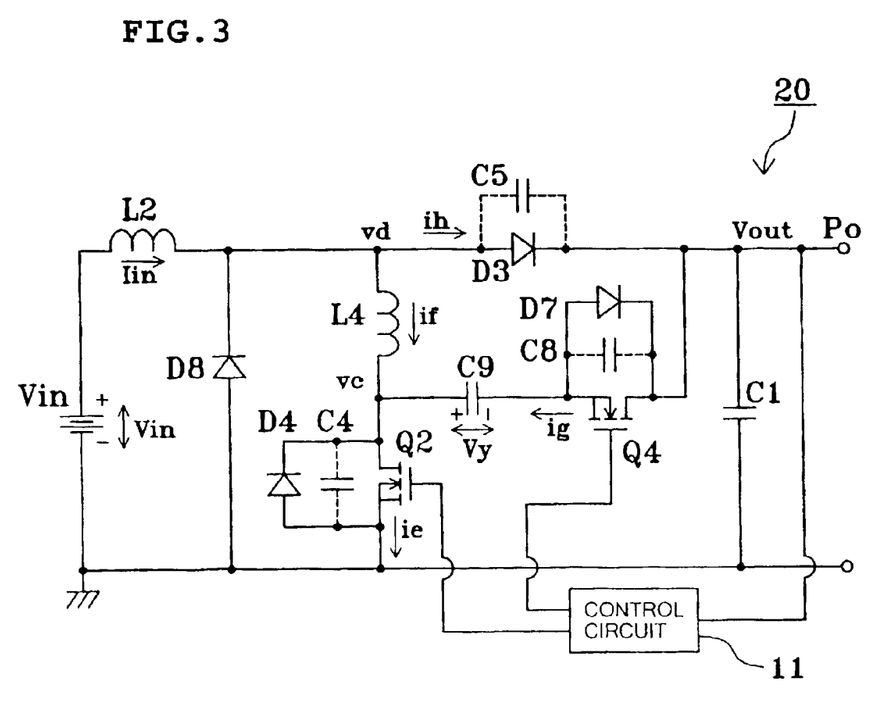
FIG. 3 is a circuit diagram showing a DC-DC converter according to another preferred embodiment of the present invention.

FIG. 3 is a circuit diagram of a DC-DC converter according to anther preferred embodiment of the present invention. In FIG. 3, elements which are the same or equivalent to those in FIG. 7 are denoted by the same reference numerals and the corresponding description will be omitted.

In FIG. 3, a DC-DC converter 20 is a step-up DC-DC converter. One end, that is, the drain of a MOSFET Q2 functioning as a first switching element is connected to the node between a rectifier diode D3 and a choke coil L2 through a resonance coil L4. Also, a series circuit including the resonance coil L4 and the rectifier diode D3 is connected in parallel to a series circuit including a capacitor C9 and a MOSFET Q4 functioning as a second switching element. A diode D7 and a capacitor C8 are connected in parallel across the drain and source of the MOSFET Q4. The diode D7 is a body diode of the MOSFET Q4 and the capacitor C8 is a junction capacitance, that is, a parallel capacitance, of the MOSFET Q4. Also, a diode D8 is connected in parallel to a series circuit including the resonance coil L4 and the MOSFET Q2. Further, a control circuit 11 is provided between an output terminal Po and the gates, that is, control terminals, of the MOSFETs Q2 and Q4. The connecting order of the capacitor C9 and the MOSFET Q4 may be inversed as long as they are connected in series.

Figure 4:
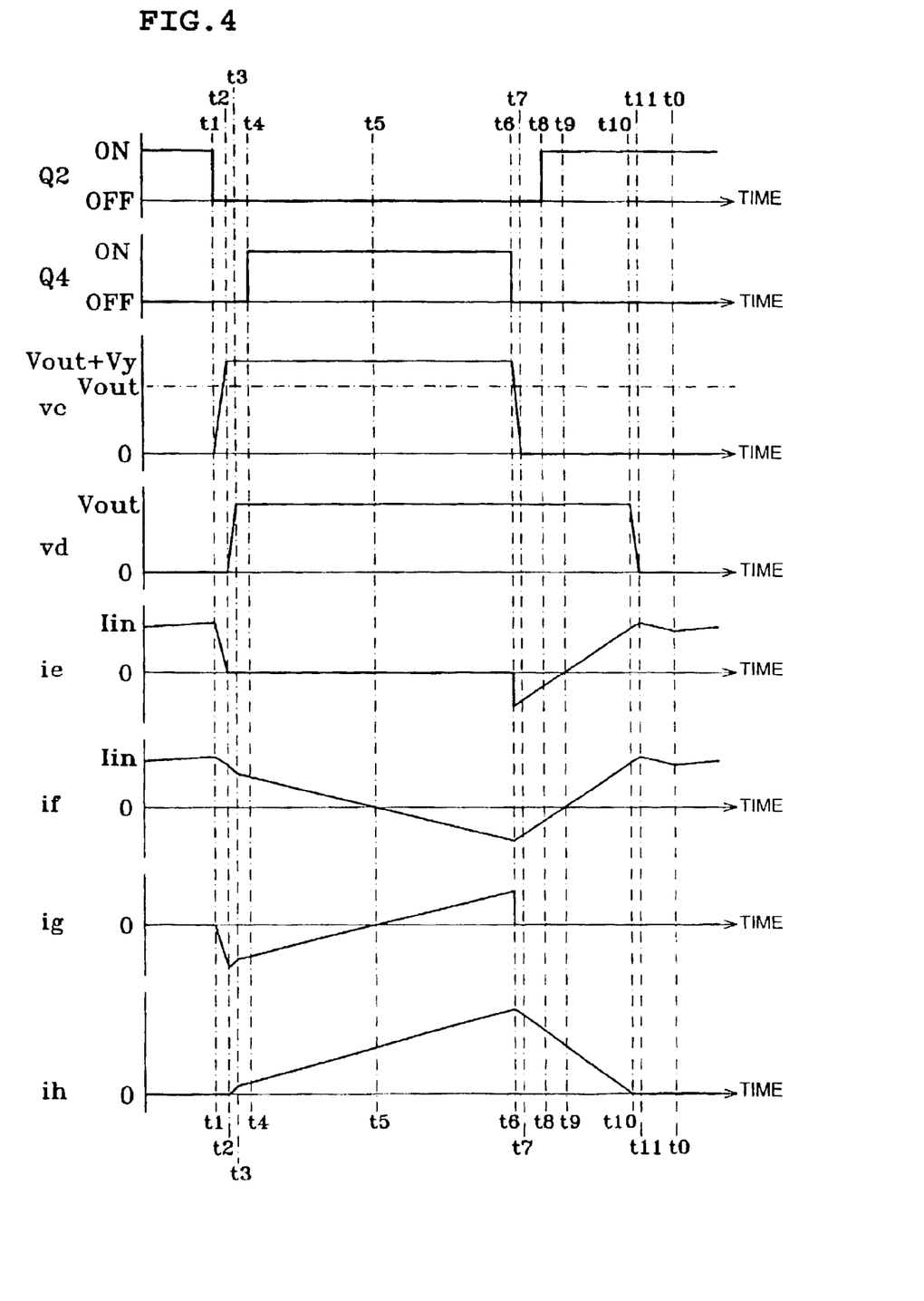
FIG. 4 is a waveform diagram showing the waveform of a signal of each portion of the DC-DC converter shown in FIG. 3.

The operation of the DC-DC converter 20 configured in this manner will be described with reference to FIG. 4. FIG. 4 is a waveform diagram showing the temporal change in voltage and current at each portion of the DC-DC converter 20. Herein, Vin represents a constant input voltage input from the DC power supply Vin, represented by the same symbol, to the DC-DC converter 20. Also, vc represents the voltage at the drain of the MOSFET Q2, vd represents the voltage at the anode of the rectifier diode D3, ie represents a current flowing from the drain toward the source of the MOSFET Q2, if represents a current flowing through the resonance coil L4 toward the MOSFET Q2, ig represents a current flowing from the drain toward the source of the MOSFET Q4, and ih represents a current flowing from the anode toward the cathode of the rectifier diode D3. The currents ie and ig include currents which flow through the capacitors C4 and C8, which are the junction capacitances of the MOSFETs Q2 and Q4 respectively, and the diodes D4 and D7, which are body diodes. Also, the current ih includes a current which flows through the capacitor C5, which is the junction capacitance of the rectifier diode D3.

In the DC-DC converter 20, a choke coil having a high inductance of about 300 $\mu$H is used as the choke coil L2. Therefore, the choke coil L2 operates as a constant current source which generates a substantially constant current Iin. In a step-up chopper circuit such as the DC-DC converter 20, an output power is obtained by storing energy by a current change of the choke coil L2. Thus, the current Iin is not perfectly constant, although it is substantially constant. Also, the currents ie and if corresponding to the current Iin change as shown in FIG. 4, but the currents ie and if are regarded as constant here. Also, the capacitor C9 has a capacitance of about 0.2 $\mu$F, which is sufficiently higher than that of the capacitor C8, which is the junction capacitance of the MOSFET Q4. Thus, the capacitor C9 operates as a constant voltage source which generates a substantially constant voltage Vy. In the following description, these two points are assumed to be true. Also, it is assumed that the forward voltage of each diode is almost zero.

The control circuit 11 performs PWM control so that the MOSFETs Q2 and Q4 are alternately turned ON, with a period when both MOSFETs Q2 and Q4 are OFF being provided between the ON periods.

When the MOSFET Q2 is ON and the MOSFET Q4 is OFF, the currents ie and if flow from the DC power supply Vin through the choke coil L2, the resonance coil L4, and the MOSFET Q2, by the input voltage Vin generated by the DC power supply Vin. The value of each of the currents is Iin. The voltage vc at the drain of the MOSFET Q2 and the voltage vd at the anode of the rectifier diode D3 are substantially equal to the ground voltage. The capacitor C9 is charged with a voltage Vy (>0) so that the MOSFET Q4 side is negative, and operates as a constant voltage source of the output voltage Vy. Also, the capacitor C4, which is the junction capacitance of the MOSFET Q2, is discharged. On the other hand, the capacitor C8, which is the junction capacitance of the MOSFET Q4, is charged so that the capacitor C9 side is negative. Also, the capacitor C5, which is the junction capacitance of the rectifier diode D3, is charged so that the choke coil L2 side is negative. Since a current is not applied to the MOSFET Q4 and the rectifier diode D3, the value of each of ig and ih is zero.

At time t1, the MOSFET Q2 is turned OFF by the control circuit 11. However, since the resonance coil L4 supplies a current due to its electrical inertia, the capacitor C4 is charged and the capacitor C8 is discharged accordingly. The capacitance of each of the capacitors C4 and C8 is very small because the capacitors C4 and C8 are junction capacitances. Thus, the charge and discharge are completed in a short time, by time t2. Therefore, the current ie rapidly decreases from Iin to zero from time t1 to time t2. Also, the current ig rapidly increases, although the current polarity is negative. After the capacitor C8 has been discharged, the diode D7 is made conductive, and the current ig starts to flow from the resonance coil L4 through the diode D7. Accordingly, the voltage vc rapidly increases from the ground voltage to Vout+Vy. After that, the relationship between the currents if and ig is if=−ig.

When the diode 7 is made conductive at time t2, the voltage at the source of the MOSFET Q4 becomes almost equal to the output voltage Vout. Thus, as described above, the voltage vc at the drain of the MOSFET Q2 becomes Vout+Vy, which is higher than that of the output voltage Vout by the voltage difference Vy of the capacitor C9. When the voltage vc at the drain of the MOSFET Q2 is increased to Vout+Vy, the current if which flows through the resonance coil L4 starts to decrease. Since the current Iin flowing through the choke coil L2 does not change, the current ih starts to flow due to a decrease in the current if so that the capacitor C5 is discharged, the voltage vd at the anode of the rectifier diode D3 increases, and thus, the rectifier diode D3 is made conductive at time t3. Due to the fact that the rectifier diode D3 conducts, the voltage vd at the anode stops increasing and becomes substantially equal to the output voltage Vout. This state continues while the rectifier diode D3 conducts. At this time, a voltage difference identical to the voltage difference Vy of the capacitor C9 is applied across the resonance coil L4 so that the side of the node between the resonance coil L4 and the MOSFET Q2 is positive. Thus, the current if, which flows through the resonance coil L4, among the current Iin flowing through the choke coil L2 linearly decreases. On the other hand, the current ih which flows toward the rectifier diode D3 linearly increases accordingly. That is, from time t3, the sum of the current flowing through the resonance coil L4 and the current flowing through the rectifier diode D3 is the current flowing through the choke coil L2. Further, the variation in the current if and the current ih depends on the charging voltage Vy of the capacitor C9 and the inductance of the resonance coil L4.

After time t3, the MOSFET Q4 is turned ON at time t4. As can be seen in FIG. 4, a dead time in which both MOSFETs Q2 and Q4 are OFF is included in the period from when the MOSFET Q2 is turned OFF until the MOSFET Q4 is turned ON. When the MOSFET Q4 is turned ON, the voltage difference across the drain and source of the MOSFET Q4 is zero due to the conduction of the diode 7, and thus, zero-voltage switching of the MOSFET Q4 is performed. From this time, the current if which has been flowing through the resonance coil L4 flows as a negative current –ig through the source-drain of the MOSFET Q4, instead of through the diode D7 Other than this, the operation of the circuit is not affected. The MOSFET Q4 should be turned ON while the diode D7 conducts. Thus, the turn-ON timing may be in the period from time t2 to time t3.

After the MOSFET Q4 is turned ON at time t4, the voltage vc and the voltage vd do not change. Thus, the current if flowing through the resonance coil L4, among the constant current Iin flowing through the choke coil L2, linearly decreases, and the current ih flowing toward the rectifier diode D3 linearly increases accordingly. Then, when the current if flowing from the resonance coil L4 toward the MOSFET Q4 reaches zero at time t5, the direction of the current if flowing through the resonance coil L4 is reversed and the current if flows toward the rectifier diode D3. At this time, the direction of the current ig is also reversed to positive. This reversal can be performed without a problem because the MOSFET Q4 is ON. The current ih flowing through the rectifier diode D3 corresponds to the current Iin flowing through the choke coil L2 at time t5, when the current if flowing through the resonance coil L4 reaches zero, and from time t5, the current ih is the sum of the current Iin flowing through the choke coil L2 and the current –if flowing through the resonance coil L4 in the reverse direction. That is, at this time too, the sum of the current flowing through the resonance coil L4 and the current flowing through the rectifier diode D3 is the current flowing through the choke coil L2. The current –if flowing through the resonance coil L4 in the reverse direction flows through the drain and source of the MOSFET Q4 in an ON-state, and thus, the relationship between the currents ig and if is ig=–if.

Then, when the MOSFET Q4 is turned OFF at time t6, the capacitor C4, which has been charged, is discharged and the capacitor C8 is charged by a resonance current of the resonance coil L4 and the capacitors C4 and C8, that is, the current –if flowing through the resonance coil L4 in the reverse direction. Therefore, the voltage at the source of the MOSFET Q4 decreases and the voltage vc rapidly decreases accordingly. Since the capacitance of each of the capacitors C4 and C8 is very small because the capacitors C4 and C8 are junction capacitances, the charge and discharge are completed in a short time by time t7. Also, when the voltage vc decreases from time t6, the current –if flowing through the resonance coil L4 in the reverse direction starts to decrease linearly. Accordingly, the current ih flowing through the rectifier diode D3 also starts to decrease linearly. That is, at this time, too, the sum of the current flowing through the resonance coil L4 and the current flowing through the rectifier diode D3 is the current flowing through the choke coil L2.

When the discharge of the capacitor C4 is completed at time t7, the diode D4 conducts, and the current –ie flowing through the diode D4 is changed to the current –if, which flows through the resonance coil L4. At this time, the voltage vc is substantially equal to the ground voltage. The voltage vd is kept substantially equal to the output voltage Vout. At this time, since the current –ie corresponds to the current –if, the current –ie also decreases linearly. Furthermore, variation in the currents if and ih depends on the output voltage Vout and the inductance of the resonance coil L4.

After time t7, the MOSFET Q2 is turned ON at time t8. As can be seen in FIG. 4, a dead time in which both MOSFETs Q2 and Q4 are OFF exists in the period from when the MOSFET Q4 is turned OFF until the MOSFET Q2 is turned ON. At this time, the voltage difference across the drain and source of the MOSFET Q2 is zero due to the conduction of the diode D4, and thus, zero-voltage switching of the MOSFET Q2 is performed.

From time t7, the voltage vc at the drain of the MOSFET Q2 is substantially equal to the ground voltage. Thus, a forward voltage that is substantially identical to the output voltage Vout is applied to one end of the resonance coil L4 and a reverse current –if decreases linearly. When the reverse current –if of the resonance coil L4 reaches zero at time t9, the current ih flowing through the rectifier diode D3 corresponds to the current Iin flowing through the choke coil L2. Furthermore, after t9, when the forward current if flows through the resonance coil L4 so that the current if increases linearly, the current ih flowing through the rectifier diode D3 decreases accordingly. When the current ih reaches zero at time t10, the rectifier diode D3 is turned OFF. In the period from time t6 to time t10, the sum of the current flowing through the resonance coil L4 and the current flowing through the rectifier diode D3 is the current flowing through the choke coil L2. That is, in the entire period from time t3 at which the rectifier diode D3 conducts to time t10 at which the diode D3 is turned OFF, the sum of the current flowing through the resonance coil L4 and the current flowing through the rectifier diode D3 is the current flowing through the choke coil L2, which is substantially constant.

When the rectifier diode D3 is turned OFF at time t10, voltage resonance occurs in the resonance coil L4 and the capacitor C5, which is the junction capacitance of the rectifier diode D3, and the negative voltage vd, in which the resonance voltage is added to the ground voltage, may be generated at the anode of the rectifier diode D3. At this time, since the capacitance of the capacitor C5 is very small, the resonance frequency of the generated voltage is high, which may result in unnecessary noise. However, the diode D8 connected in parallel to the series circuit including the MOSFET Q2 and the resonance coil L4 is arranged so as to supply a current from the ground toward the anode of the rectifier diode D3. Thus, the voltage resonance ends when the voltage vd decreases to reach the ground voltage at time t11. Incidentally, when the rectifier diode D3 has sufficient voltage-resistance and the effects of noise need not be considered, the diode D8 need not be provided.

When the voltage resonance ends at time t11, the voltage across the resonance coil L4 becomes the ground voltage. Further, a constant current if is applied to the resonance coil L4, the constant current if being generated by combining the current Iin flowing through the choke coil L2 and a current for regenerating the energy stored in the resonance coil L4 during the period of voltage resonance, that is, from time t10 to time t11, through the diode D8.

Then, the process returns to time t1 and the above-described cycle is repeated.

In the above-described description, the choke coil L2 is regarded as a constant current source through which a constant current flows. Actually, a triangular ripple current is included, and the current flowing through the choke coil L2 increases from time t10 to time t1 and decreases from time t1 to time t10. However, since a current flows through the diode D8 from time t10, the current if increases. Also, the current flowing through the diode D8 decreases, the current flowing through the resonance coil L4 decreases from time t11 accordingly, and the current flowing through the diode D8 reaches zero at time t0 so that the diode D8 is turned OFF. At this time, the current flowing through the resonance coil L4 corresponds to the current flowing through the choke coil L2. Since the current flowing through the choke coil L2 continues to increase until time t1, the current flowing through the resonance coil L4 also increases.

As described above, in the DC-DC converter 20 of the present preferred embodiment, the MOSFET Q2 functioning as the first switching element and the MOSFET Q4 functioning as the second switching element are turned ON when there is no voltage difference across the drain and source due to the conduction of the body diode. Therefore, zero-voltage switching of the switching element is realized and almost no switching loss occurs.

Further, the MOSFET Q2 functioning as the first switching element and the MOSFET Q4 functioning as the second switching element are alternately turned ON, and a dead time is adequately provided so that both MOSFETs being in the ON-state at the same time is prevented. When the MOSFETs Q2 and Q4 are turned ON or turned OFF, the junction capacitance between the terminals of each switching element, that is, the capacitors C4 and C8 functioning as the junction capacitances of the drain and source, are charged or discharged by the current if flowing through the resonance coil L4 until the diodes D4 and D7 defining body diodes are made conductive. Accordingly, momentary discharging of the charge of the junction capacitance due to a short circuit is prevented, and thus, generation of noise is greatly reduced and minimized.

Also, during the period from time t3 to time t10, the current ih flowing through the rectifier diode D3 gradually changes in accordance with the change in the current if flowing through the resonance coil L4. Thus, generation of noise is greatly reduced and minimized.

Also, during the period from time t10 to time t11, the anode voltage of the rectifier diode D3 decreases due to voltage resonance of the resonance coil L4 and the junction capacitance of the rectifier diode D3. Thus, the ground voltage is not abruptly applied to the anode when the rectifier diode D3 is turned OFF. Accordingly, a recovery current does not flow in the rectifier diode D3 during a reversed recovery time when the ground voltage is abruptly applied to the anode. Thus, noise and loss are greatly reduced and minimized.

The capacitance of each of the capacitors C4, C8, and C5, which are junction capacitances of the MOSFETs Q2 and Q4 and the rectifier diode D3 respectively, is small. Therefore, the resonance frequency of the resonance circuit including the resonance coil L4 is high. In other words, the resonance period is short. Therefore, as in the DC-DC converter 10, PWM control that deal with a wide-range variation in the input voltage and variation in the output voltage due to a load variation can be performed.

Further, as in the DC-DC converter 10, in this preferred embodiment, a sine-wave resonance current does not flow through the MOSFET Q2 functioning as the first switching element. Accordingly, a switching element having a current capacitance that is larger than necessary is not required and thus, increases in the size and cost of the DC-DC converter are prevented.

In the above-described preferred embodiments, a step-down or step-up DC-DC converter using a positive power supply is preferably used. However, a step-down or step-up DC-DC converter using a negative power supply may be also used. In this case, the same operation and advantages are obtained as in a positive power supply.

Also, in the above-described preferred embodiments, a MOSFET including a body diode is preferably used as a switching element. However, a bipolar transistor or a three-terminal thyristor without a body diode may also be used. In this case, a diode is externally connected in parallel to the bipolar transistor or the three-terminal thyristor, in the same arrangement as the body diode of the MOSFET. With this configuration, the same operation and advantages as in the MOSFET are obtained.

Further, in the above-described preferred embodiments, each of the first and second switching elements and the rectifier diode preferably has a junction capacitance as a parallel capacitance. However, if the resonance condition between each of these elements and a resonance coil is not optimized, another capacitor is connected in parallel.

Figure 5:
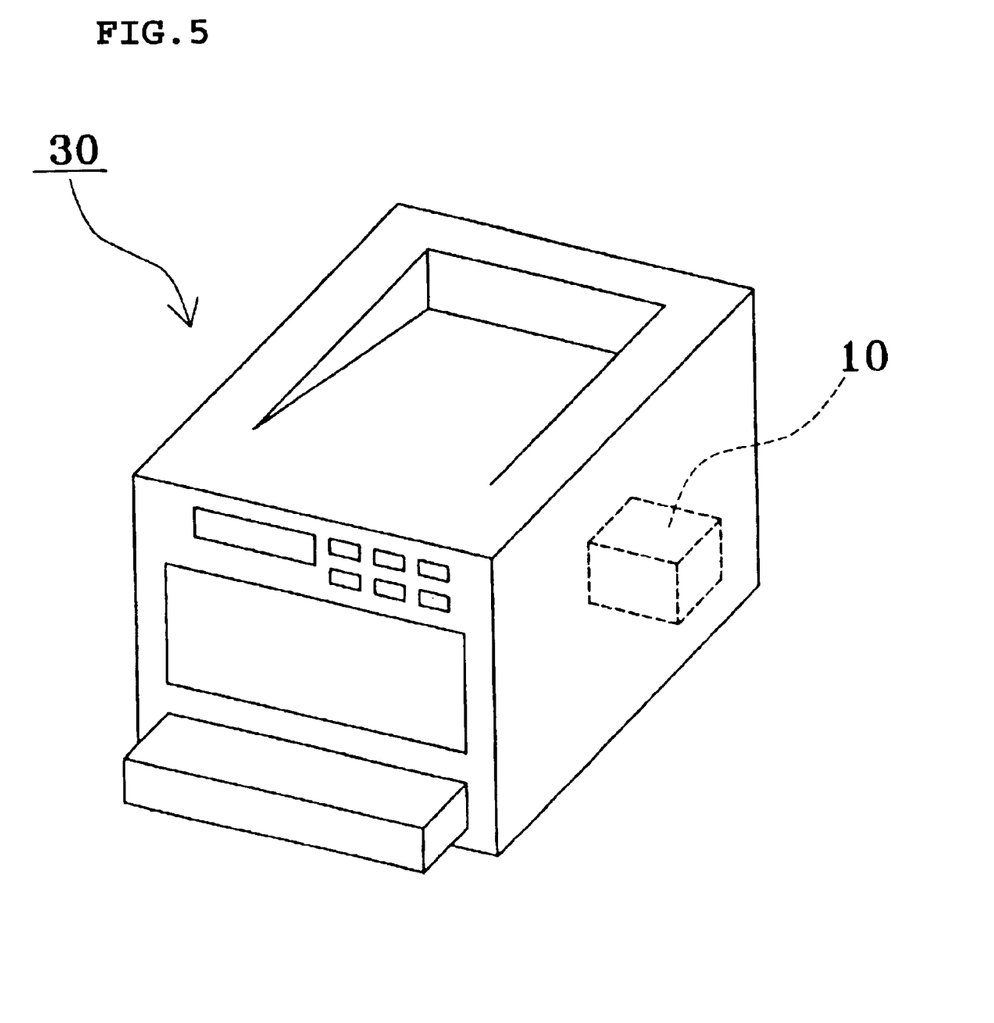
FIG. 5 is a perspective view showing an electronic device according to another preferred embodiment of the present invention.

FIG. 5 is a perspective view showing an electronic device according to another preferred embodiment of the present invention. In FIG. 5, a printer 30 as an electronic device includes the DC-DC converter 10 of other preferred embodiments of the present invention as a power supply circuit.

In the printer 30, by using the DC-DC converter 10 of various preferred embodiments of the present invention, power consumption and noise are greatly reduced.

The printer 30 shown in FIG. 5 includes the DC-DC converter 10 shown in FIG. 1, but the same operation and advantages are obtained when the DC-DC converter 20 shown in FIG. 3 is used.

As the electronic device of the present invention, various types of electronic device which include a DC-DC converter may be used, such as a notebook personal computer and a portable information apparatus, as well as a printer.

While preferred embodiments of the invention have been described above, it is to be understood that variations and modifications will be apparent to those skilled in the art without departing the scope and spirit of the invention. The scope of the invention, therefore, is to be determined solely by the following claims.

What is claimed is:

1. A DC-DC converter comprising:

a rectifier diode;

a choke coil having one end thereof connected to one end of the rectifier diode;

a first switching element having one end thereof connected to a node between the rectifier diode and the choke coil through a resonance coil;

a first diode connected in parallel to the first switching element;

a second switching element;

a series circuit including a capacitor and the second switching element and connected in parallel to a series circuit including the resonance coil and the rectifier diode; and a second diode connected in parallel to the second switching element;

wherein each of the first and second switching elements and the rectifier diode includes a parallel capacitance between terminals thereof.

2. The DC-DC converter according to claim 1, wherein the first and second switching elements are alternately turned ON and a period when both switching elements are OFF is provided between the ON periods.

3. The DC-DC converter according to claim 1, wherein, in a period when the rectifier diode conducts, a sum of a current flowing through the rectifier diode and a current flowing through the resonance coil flows through the choke coil.

4. The DC-DC converter according to claim 1, wherein the other end of the first switching element is connected to one end of a DC power supply, the other end of the choke coil is connected to an output terminal, and the other end of the rectifier diode is connected to the other end of the DC power supply, such that a step-down operation is performed.

5. The DC-DC converter according to claim 1, wherein the other end of the choke coil is connected to one end of a DC power supply, the other end of the rectifier diode is connected to an output terminal, and the other end of the first switching element is connected to the other end of the DC power supply, such that a step-up operation is performed.

6. The DC-DC converter according to claim 1, further comprising a third diode connected in parallel to a series circuit including the first switching element and the resonance coil.

7. The DC-DC converter according to claim 4, wherein a positive power supply is used for the step-down operation.

8. The DC-DC converter according to claim 4, wherein a negative power supply is used for the step-down operation.

9. The DC-DC converter according to claim 5, wherein a positive power supply is used for the step-up operation.

10. The DC-DC converter according to claim 5, wherein a negative power supply is used for the step-up operation.

11. The DC-DC converter according to claim 1, wherein at least one of the first switching element and the second switching element includes a MOSFET including a body diode.

12. The DC-DC converter according to claim 1, wherein at least one of the first switching element and the second switching element includes at least one of a bipolar transistor and a three-terminal thyristor.

13. The DC-DC converter according to claim 1, wherein each of the first and second switching elements and at least one of the first and second diodes has a junction capacitance defining the parallel capacitance.

14. The DC-DC converter according to claim 1, wherein the first and second switching elements comprise first and second MOSFTETS, the DC-DC converter further comprising a control circuit provided between an output terminal and the gates of the first and second MOSFETs so as to perform PWM control so that the first and second MOSFETs are alternately turned ON and such that a period when both MOSFETs are OFF is provided between the ON periods.

15. An electronic device including the DC-DC converter according to claim 1.

16. The electronic device according to claim 15, wherein the electronic device is a printer.

* * * * *